O. P. Drake,
Carbureter.
No. 1,819. Reissued Nov. 15, 1864.
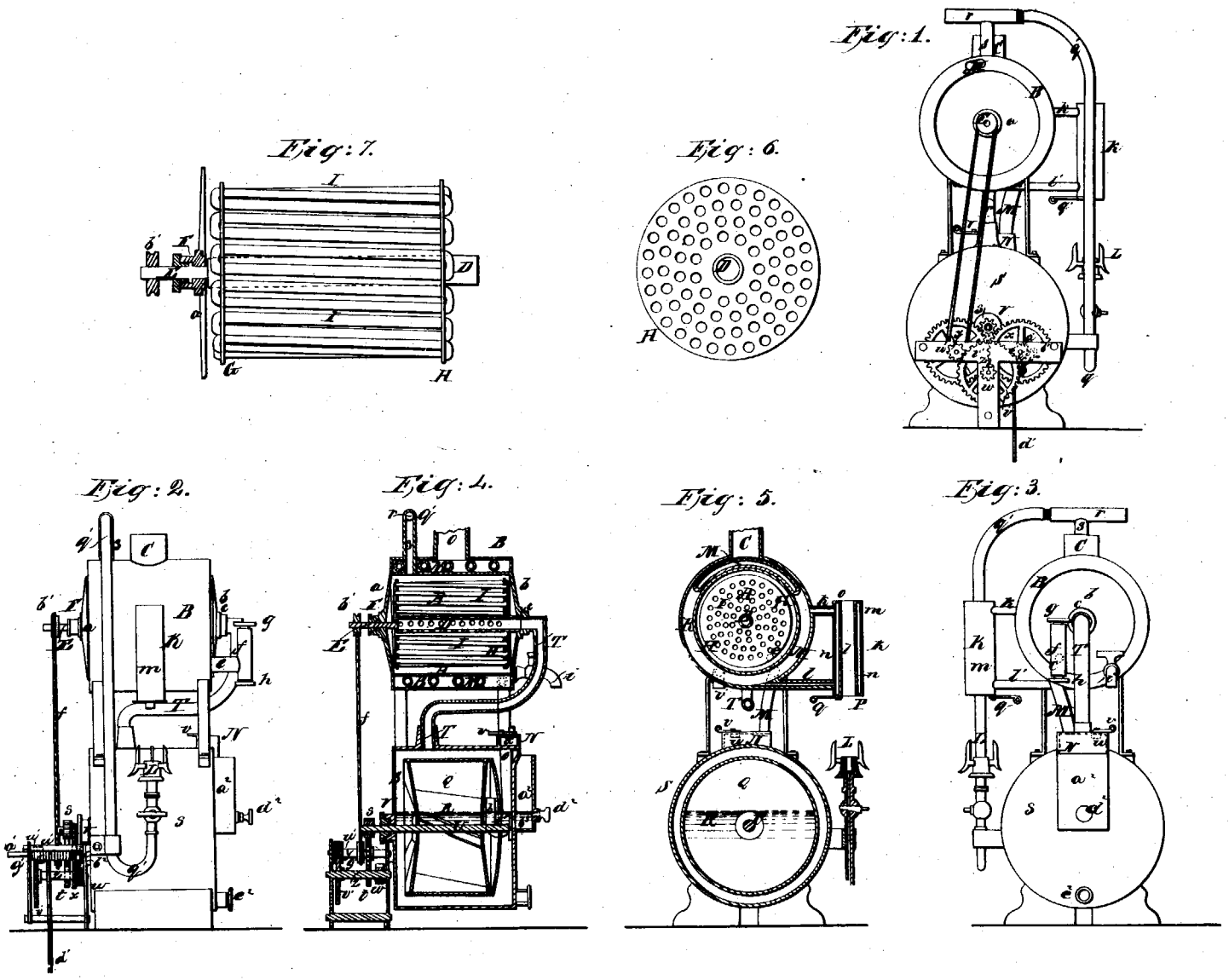
N. PETERS, PHOTO-LITHOGRAPHER, WASHINGTON, D. C.

UNITED STATES PATENT OFFICE.

OLIVER P. DRAKE, OF BOSTON, MASSACHUSETTS.

IMPROVED APPARATUS FOR COMBINING HYDROCARBON VAPOR WITH AIR.

Specification forming part of Letters Patent No. 9,967, dated August 30, 1853; Reissue No. 1,819, dated November 15, 1864.

*To all whom it may concern:*

Be it known that I, OLIVER P. DRAKE, of Boston, in the county of Suffolk and State of Massachusetts, have invented a new and improved apparatus for vaporizing benzole or other suitable volatile hydrocarbon, and mixing it with atmospheric air, so that the mixture may be burned for the purposes of illumination or otherwise; and I do hereby declare that the same is fully described and represented in the following specification and the accompanying drawings, letters, figures, and references thereof.

Of the said drawings, Figure 1 denotes a front elevation of my said apparatus. Fig. 2 is a side elevation of it. Fig. 3 is a rear elevation of it. Fig. 4 is a vertical and longitudinal section of it. Fig. 5 is a transverse and vertical section of it, taken through the water-heater and gas-burner, to be hereinafter described.

In the same, A represents a closed cylindrical or other proper shaped water-tight vaporizing-chamber or generator, which is surrounded by or placed concentrically within a water vessel or cistern, B, that is to be filled wholly or partially with water or a liquid, so that the same may rest against the external surface of the said vaporizing-chamber, there being an opening or pipe, C, in or at the top of the vessel B, for the purpose of enabling it to be supplied with water whenever necessary, such water being poured into such opening or pipe. Extending centrally through the chamber A is a hollow shaft, D, which terminates at its front end in or is connected to a solid shaft, E, that passes through and turns in a water-tight stuffing-box, F, attached to the head *a* of the vaporizing-chamber, and has a small grooved pulley, *b*, fixed on it. The opposite or rear end of the shaft is made open and to revolve in a suitable bearing, *c*, applied to the head *b* of the chamber A. Two circular disks or metallic plates, G H, are fixed on the shaft and near to its extremities and within the vaporizing-chamber, the shaft being to pass centrally through them. Each one of these disks is perforated with numerous holes, which may be arranged in concentric circles, as seen in Fig. 6, which denotes a side view of one of the plates. These holes are calculated to receive and support cotton wicking or other suitable fibrous rope or absorbent material, which is to be made to extend from disk to disk by being laced or run through the holes thereof. Fig. 7 is a side view of the shaft, disks, and lacing of fibrous material, which, together, I term the "vaporizer" I.

The hollow shaft of the vaporizer should be perforated with numerous holes, so that when air is blown into the open end of the shaft it may be made to pass laterally out of the perforations and to impinge against the surrounding strands of wicking or fibrous material. A short tube, *e*, extends horizontally out of the lower part of the rear end of the vaporizing-chamber A, and opens into a vertical tube, *f*, whose top is arranged at the maximum height to which the benzolic liquid in the vaporizing-chamber is to stand.

Screw-caps *g h* are respectively adapted to the upper and lower ends of the tube *f*. By removing the lowest cap from the tube we are enabled to draw any liquid out of the vaporizing-chamber. The hot-water vessel B also has a cock, *i*, adapted to its lower part, by which it may be emptied of water, whenever such may be desirable or necessary. Connected with the water-vessel B by means of two tubes, *k l'*, is a heater, K, the tubes being made to respectively open into the upper and lower parts of it. The heater consists of a cylindrical water-tight vessel composed of two tubes, *l m*, placed concentrically, the one within the other, and so that there shall be a water-space, *n*, between them, which water-space is closed by annuli *o p* at top and bottom. The inner tube, *l*, of the heater is thus left open at both ends, so that smoke or heat from the flame of a gas-burner, L, may pass up through it. The lower end of the heater is provided with a small closing door or turning valve, *q*, which is to be so adapted to the same as to enable a person to close the end of the tube *l* to any desirable extent, in order to diminish the current of heat passing through it.

The gas-burner L, made in the ordinary way, is connected with the vaporizing-chamber A by a tube, *q'*. It is intended that the gas-burner and heater shall be placed in any convenient situation. The tube *q'* communicates with the vaporizing-chamber A by being connected with one end of a short horizontal tube, *r*, that is made to communicate with the vaporizing-chamber by a vertical tube, *s*. A pipe for transmitting the mixture of air and benzolic vapor to other burners may be connected with the opposite end of the tube *r*.

An induction air-pipe, M, opens out of one end of the water-vessel B, and is coiled within said vessel and around the vaporizing-chamber A, and finally passes out of the bottom of the vessel B and enters the top of a small chamber, N. In the top of this chamber N there is a hole or opening, *u*, which is provided with a closing-slide, *v*, so adapted to it as to enable a person either to cover the opening or uncover it to any desirable extent. Out of the bottom of the chamber N a pipe, O, is led downward and into the opening P of one end of a rotary blowing apparatus, Q. From thence it is extended upward above the surface of the water R, in which the said meter-wheel is partially immersed. This rotary blowing apparatus may be made in any known or desirable form; but I prefer to make it substantially like the meter-wheel of a gas-meter of the kind termed the "wet-meter," revolving within a closed case, S. As it is a well-known contrivance, and as I would avoid unnecessary prolixity in the description of my apparatus, I do not deem it necessary to enter into a further explanation of its construction. It is made to revolve in the water of the case S, and to receive air from the pipe O at one end and discharge it into the space of the case S which is above the water. From out of this space a pipe, T, is led and made to open into or communicate with the open end of the hollow shaft D.

The axle U of the rotary blowing apparatus extends through and works in a stuffing-box, V, applied to the side of the case S, and has a pinion-gear, *s*, fixed on it. The pinion *s* engages with a train of gears and pinions, *t u′ v′ w x*, which are arranged and situated on three shafts, *y z a′*. The latter, *x*, turns freely on the shaft *a′*, and has a spring-pawl, $b^2$, fitted to one side of it, and made to engage with a ratchet-wheel, *c′*, fixed on the shaft *a′*. A cord, *d′*, has one end affixed to the shaft *a′*, the other end having a weight connected to it. By applying a key or crank to one end of the shaft *a′*, and turning it so that the ratchet-wheel shall slip on the spring pawl $b^2$, the cord may be wound on the shaft *a′*, so as to elevate the weight. The descent of the weight will set in motion the train of gears, so as to communicate a rotary motion to the meter-wheel. The meter-wheel is thus made to force air with uniform pressure into the hollow shaft D, which, rushing out of its perforations and against the benzole liquid taken up by the vaporizer I, will cause the liquid to be evaporated and be mixed with it, and the mixture thus formed will issue at the burner under a pressure which is uniform, whether a greater or less quantity of it is burned.

Should the air become too much heated, so as to produce an undue evaporation of the benzole, an indication of which will be the production of an undue quantity of smoke from the flame of the burner, the small slide *v* of the opening *u* may be moved so as to uncover the opening to the extent sufficient to allow a proper quantity of cool air to pass into the pipe O of the meter-wheel and mix descending currents of hot air. This, as a matter of course, will modify or lessen the heat of the air passing into the vaporizer.

Should the water in the vessel B become too hot, by turning the slide of the heater so as to interrupt the passage of the heat of the flame of the burner up through the heater we can diminish or regulate the heat thereof. The vaporizer is revolved by means of an endless band, *f′*, made to pass around the grooved pulley *b′*, and another grooved pulley, *g′*, the latter being fixed on the shaft *y*. By this means the liquid is constantly agitated during the operation of the apparatus, and thus prevents the separation of the more volatile products, and maintains the liquid at a more uniform degree of density than this can otherwise be obtained. The common wet-meter for gas, as ordinarily constructed and used, has its wheel turned by the pressure of the gas. It is not rotated by a power applied on the outside of the meter and to the shaft of the wheel, as is the case in my apparatus.

The meter-wheel, its case, and the fluid contained therein are employed in my apparatus for an entirely different purpose, and are made to operate in an entirely different manner from what they are when used to measure the amount of gas consumed or made to flow through the meter-wheel. The application of the meter-wheel, its closed case, and the liquid thereof for the purpose of forcing air through a vaporizing-chamber is new, to the best of my knowledge and belief.

In my apparatus the meter-wheel receives air, instead of gas, through the pipe O, and, being put in revolution, its chambers are alternately filled with air and water, so as to force air into the space of the case that is above the surface of the water.

While the velocity of revolution of the meter-wheel remains constant, the equal measures of air are delivered into the vaporizing-chamber, and, of course, to the burner or burners in equal times. The resistance of the water to the meter-wheel while the latter is in revolution forms an excellent power to counteract the gravitating tendency of the weight suspended from the cord of the axle *a′*, and cause such weight to fall with a regular velocity. Therefore, to increase the velocity of revolution of the meter-wheel, it will be necessary to increase the weight on said cord.

On the back of the case S there is a small chamber, $a^2$, it being made open at top and to extend down to about the middle of the e[illegible] of the case. This chamber communicates with the interior of the case S by an orifice, $b^3$. The object of the chamber is to enable a person to supply the case S with water, which may be poured into the open top of the chamber, and will run from the chamber into the case. A small screw-plug, $d^2$, is inserted in the orifice made in the side of the chamber $a^2$, at the height at which the water is to stand in the case S. By removing the plug the water from the case S will run out of its orifice until it reaches the level of the bottom thereof. An orifice and screw-plug, as seen at $e^2$, is arranged at the lower part of the case S, for the purpose of enabling it to be freed from water whenever necessary.

An apparatus made in the above-mentioned manner will not only be found very efficient in the production of benzole vapor mixed with air, but will produce such a regular pressure and flow of such aeriform mixture through its gas-burner as will cause an unsurpassed steadiness in the height of the flame. Besides, the luminosity of the flame is far greater than that of the coal-gas.

Having thus described the nature of my said invention and the manner in which the same is or may be carried into effect, I would observe that I am aware that for the purposes of evaporating saccharine fluids a hollow shaft surrounded by plates and having perforations has been made to revolve over an open cistern (containing the saccharine liquor) while air has been blown into such shaft and made to pass against the plates partially immersed in the liquid and put in revolution. I therefore do not claim such; but—

What I do claim as my invention, and for the purpose of vaporizing benzole or other suitable volatile hydrocarbon and mixing it with air, is—

1. The vaporizing-chamber and rotary blowing apparatus, combined in the manner and for the purpose substantially as set forth.

2. The combination of the vaporizing-chamber and rotary blowing apparatus, under the general arrangement described, with a weight or its equivalent acting with a uniform force, so that the pressure at the burner is uniform, whether a greater or less quantity of the mixed air and vapor is burned.

3. The combination of the vaporizing-chamber with the mechanical agitator for the purpose of agitating the liquid during the mixture of the vapor with air, substantially as set forth.

4. The combination of the heater and gas-burner with the water-vessel and vaporizing-chamber, substantially as specified, so that by means of the said heater and gas-burner and the pipes connecting them with the water-vessel and the chamber the whole or a part of the mixture of air and benzole vapor produced by the apparatus may not only be used in any convenient place for the purpose of illumination, but also for heating the water of the vessel, substantially as set forth.

5. The combination of the closed vaporizing-chamber, the rotary vaporizer or disseminator, (placed therein,) and the rotary meter-wheel and its closed case, or an air-forcing apparatus so made as to force a stream of air into the hollow shaft of the vaporizer and through or against saturated portions of the disseminator, and into the vaporizing-chamber or regenerator, so as to vaporize the benzole or hydrocarbon and mix it with air, substantially as above specified.

6. In combination with the rotating meter-wheel and its case and the hot-water vessel, the coiled induction air-pipe, as made to pass through the water in the vessel, and thereby receive heat therefrom, so as to warm the air as it passes through the pipe and to supply oxygen to the volatilized vapors, and for the purpose of facilitating the evaporation of the same.

7. In combination with the induction air-pipe, the chamber and its regulator slide and orifice applied for the purpose of supplying cold air to the warmed air or to the meter-wheel, in order to diminish or regulate the temperature of the air passing into the said wheel and forced into the vaporizing-chamber.

8. The peculiar mode of making the rotary disseminator or vaporizer—viz., of two perforated heads or disks, a hollow perforated shaft, and strands of lamp-wicking, or other asorbent material, stretched from one head to the other, as specified.

In testimony whereof I have signed this specification in presence of two witnesses.

Witnesses: OLIVER P. DRAKE.

A. POLLOK,

JOHN DUNCAN.